United States Patent [19]

Keating

[11] Patent Number: 4,624,178

[45] Date of Patent: Nov. 25, 1986

[54] PROTECTIVE COVER FOR TEMPERATURE CONTROL

[76] Inventor: Richard Keating, 330 Sutton Rd., Barrington Hills, Ill. 60010

[21] Appl. No.: 783,168

[22] Filed: Oct. 2, 1985

[51] Int. Cl.⁴ ............................................. A47J 37/12
[52] U.S. Cl. ...................................... 99/337; 99/403; 200/333
[58] Field of Search ................ 99/403, 337; 200/333; 220/305, 306; 403/23; 70/455

[56] References Cited

U.S. PATENT DOCUMENTS

| | | |
|---|---|---|
| 2,813,938 | 11/1957 | Speizman ........................ 200/333 X |
| 3,204,807 | 9/1965 | Ramsing ........................ 200/333 X |
| 3,527,914 | 9/1970 | Spacek ........................ 200/333 |
| 4,032,749 | 6/1977 | Price ........................ 99/337 X |

*Primary Examiner*—Billy J. Wilhite
*Attorney, Agent, or Firm*—Nicholas A. Camasto

[57] ABSTRACT

A metal protective cover for the temperature control knob on a deep fat fryer includes an outer annular ring and is formed to enclose the control knob. The control knob is surrounded by an annular backing plate that is secured by three screws. The annular ring has a diameter that is small enough to fit within the circle inscribing the shanks of the three screws and large enough to be held in place by the screw heads.

3 Claims, 4 Drawing Figures

U.S. Patent  Nov. 25, 1986  4,624,178
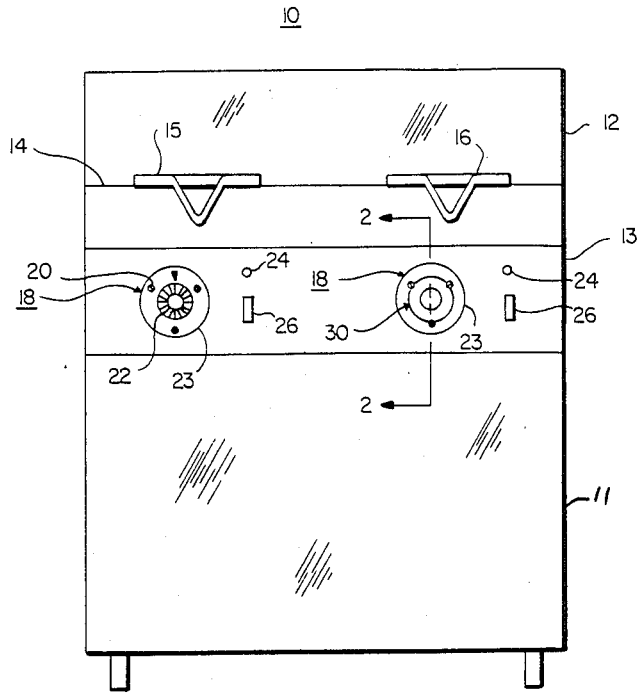
FIGURE 1
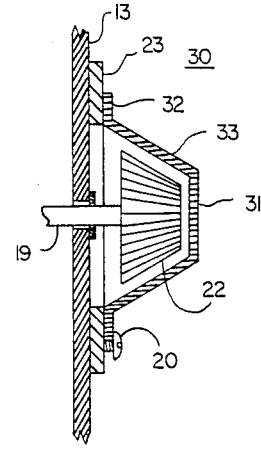
FIGURE 2
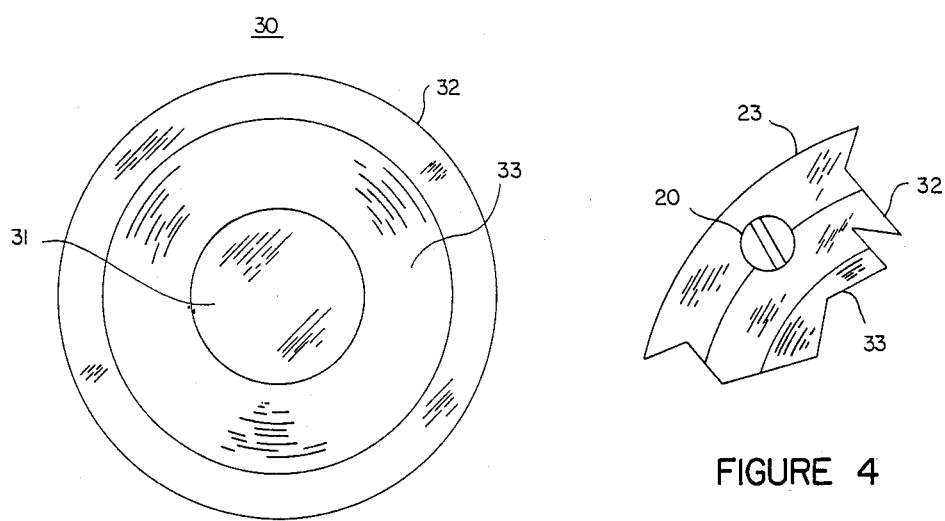
FIGURE 3
FIGURE 4

PROTECTIVE COVER FOR TEMPERATURE CONTROL

BACKGROUND OF THE INVENTION

This invention relates generally to commercial cooking equipment temperature controls and particularly to means for preventing accidental disturbance thereof.

The kitchens of commercial restaurants and so-called "fast food" establishments are generally very busy, congested places. These areas include, in addition to refrigeration and food preparation equipment, cooking equipment such as ovens, griddles and deep fryers that are continually in use. Consequently the cooking equipment is positioned for ease of access, which usually means the equipment is located along heavily travelled paths. The resultant susceptibility of the cooking equipment to accidental bumping and the like can cause significant problems in a restaurant kitchen.

The cooking temperature of foods is often quite critical, especially for deep fat-fried foods where the temperature of the cooking fat or oil has a marked effect on texture and flavor. If the cooking oil temperature is too high, foods tend to have a burnt taste and a very crisp exterior; if it is too low, foods tend to absorb too much fat and develop a soggy exterior. On most commercial deep fat fryers and similar cooking equipment, the temperature controls are mounted to a control panel that is positioned for easy access on the front of the cabinet. The temperature controls are adjustable and include a calibrated knob arrangement to enable the desired cooking temperature for the cooking oil or fat to be set. For a number of reasons, of no interest to this inventiion, temperature control knobs are usually positioned so that they protrude from the front of the cooking unit where they are prone to accidental bumping by persons (and objects). As mentioned, the location of the equipment in heavily travelled areas exacerbates the problem. A temperature control knob may be inadvertently disturbed and the cooking temperature of the deep fat fryer or oven changed without the knowledge of the cook or other responsible person. Thus food being prepared in that piece of cooking equipment will not cook at the proper temperature and as mentioned above, will result in either an inferior cooked product or a wasted product. Even in a situation where a person disturbing a temperature control is aware of the fact and immediately takes corrective action, the setting to which the temperature control is returned may not be the original one. Consequently there is a need in the art for a simple, low cost device which effectively precludes the possibility of the temperature control of such a cooking device being disturbed.

OBJECTS OF THE INVENTION

The principal object of the invention is to provide an improved cooking unit.

Another object of the invention is to provide a simple apparatus to preclude disturbance of the temperature setting of a cooking unit.

BRIEF DESCRIPTION OF THE DRAWING

Other objects and advantages of the invention will be apparent upon reading the following description in conjunction with the drawing, in which:

FIG. 1 represents a simplified depiction of a deep fat fryer constructed in accordance with the invention;

FIG. 2 is an enlarged partial sectional view taken along the lines 2—2 of FIG. 1;

FIG. 3 is a front view of the protective cover of the invention; and

FIG. 4 is an enlarged partial view illustrating means for mounting the protective cover to the equipment.

DESCRIPTION OF THE PREFERRED EMBODIMENT

Referring to FIG. 1, a well known type of commercial deep fat fryer 10 is generally illustrated. It has a cabinet that includes a lower front panel 11, an upper back or splash panel 12 and a control panel 13. A surface cooking area is indicated at 14 and may include a pair of deep open-top vessels (not shown) for holding a relatively large quantity of heated cooking oil. Wire baskets 15 and 16, of conventional open mesh construction, are partially illustrated in the cooking area and may be supported in the heated cooking oil by any conventional means (not shown). Deep fat fryer 10 includes two temperature control elements 18 and associated means (not shown), all sometimes referred to collectively as temperature control means or as control means, for regulating the temperature of the cooking oil in the respective individual cooking vessels. Each temperature control element 18 includes a calibrated control knob 22 that is conventionally marked with temperature indicia and a flat ring shaped backing plate 23 which is affixed to the cabinet by a plurality of screw fasteners 20. An indicator light 24 and a control switch 26 are positioned close to each respective temperature control element for indicating when the control element is functional and for turning the heat source, that is under control of the temperature control element, On or Off. The temperature control means on the right hand side is shown with a protective cover 30 installed.

Referring to FIG. 2, the general construction of protective cover 30 of the invention may be seen. Cover 30 has a generally circular center portion 31 that is centrally disposed with respect to, but displaced from, a larger annular ring portion 32. Center portion 31 is joined to ring portion 32 by a generally conical portion 33. It will be appreciated that the protective cover is preferably formed in one piece, generally by spinning or stamping a metal sheet of a thickness approximating that of a wall of the cabinet of the deep fryer. The dimensions of the protective cover are such that control knob 22 may be fully enclosed without interference therewith so that when protective cover 30 is installed, the setting of the control knob can not be changed. As seen in FIGS. 3 and 4, the preferred form of installation of protective cover 30 for a cooking unit having an indicator plate that is affixed with mounting screws, is by means of those same mounting screws. Thus the outer diameter of annular ring portion 32 is selected to be slightly smaller than the diameter of the circle inscribing the shanks of the fastening screws 20. Thus the larger heads of the fastening screws will overlap annular ring 32 of protective cover 30 and thereby secure it to the ring. This is best illustrated in FIG. 4, where a detailed section shows the head of a fastening screw 20 overlapping a portion of annular ring 32. It will of course be appreciated that other methods of affixing the protective cover may also be used.

With the invention, the desired temperature setting for the cooking control element may be made and thereafter protected from change by affixing the protective cover of the invention. Thus a simple, effective and low cost solution to the problem of disturbance of the temperature control element has been provided.

It is recognized that numerous modifications and changes in the described embodiment of the invention will be apparent to those skilled in the art without departing from its true spirit and scope. The invention is to be limited only as defined in the claims.

What is claimed is:

1. In combination with a deep fat fryer, or the like, including a cabinet having a front and housing a cooking vessel containing a quantity of cooking oil and means for heating the cooking oil to cooking temperature;

control means, mounted on the cabinet front, for setting the temperature of said cooking oil, said control means including a rotatable knob means for adjustment thereof;

protective cover means, comprising a metal shell having an annular ring portion, configured to enclose said rotatable knob means for preventing access thereto;

said control means including a plurality of circularly arranged screws having shanks and enlarged heads, the diameter of said ring portion being small enough to fit within a circle inscribing the shanks of said screws and large enough to be held in place by said enlarged heads; and said protective cover means being maintained in position enclosing said control knob by the enlarged heads of said screws.

2. The combination of claim 1 wherein said metal cover means is spun from sheet metal.

3. In combination with a deep fat fryer, or the like, including a cabinet having a front and housing a cooking vessel containing a quantity of cooking oil and means for heating the cooking oil to cooking temperature;

a control element, mounted on the cabinet front, for setting the temperature of said cooking oil, said control element including a rotatable knob for adjustment of said temperature, that protrudes from said cabinet;

a protective cover configured to enclose said rotatable knob for preventing access thereto, said protective cover comprising a spun metal shell having an annular ring portion;

an annular backing plate mounted to said cabinet with screws having shanks and enlarged heads and being positioned in surrounding relationship to said rotatable knob;

the diameter of said ring portion being small enough to fit within the circle inscribing said shanks and large enough to be held in place by said enlarged heads; and said protective cover being affixed to said backing plate means by said screws.

* * * * *